(12) United States Patent
Tsuji et al.

(10) Patent No.: US 7,981,571 B2
(45) Date of Patent: Jul. 19, 2011

(54) POLYMER ELECTROLYTE FUEL CELL

(75) Inventors: Yoichiro Tsuji, Osaka (JP); Yasuhiro Ueyama, Hyogo (JP); Makoto Uchida, Osaka (JP); Yusuke Ozaki, Nara (JP)

(73) Assignee: Panasonic Corporation, Osaka (JP)

( * ) Notice: Subject to any disclaimer, the term of this patent is extended or adjusted under 35 U.S.C. 154(b) by 1020 days.

(21) Appl. No.: 11/632,407

(22) PCT Filed: Jul. 12, 2005

(86) PCT No.: PCT/JP2005/012866
§ 371 (c)(1),
(2), (4) Date: Jan. 12, 2007

(87) PCT Pub. No.: WO2006/006607
PCT Pub. Date: Jan. 19, 2006

(65) Prior Publication Data
US 2008/0075996 A1    Mar. 27, 2008

(30) Foreign Application Priority Data

Jul. 13, 2004    (JP) .................................. 2004-206128

(51) Int. Cl.
*H01M 4/02*    (2006.01)
(52) U.S. Cl. ........................................ 429/524; 429/523
(58) Field of Classification Search ........... 429/523–534
See application file for complete search history.

(56) References Cited

U.S. PATENT DOCUMENTS 5,472,799 A    12/1995    Watanabe
5,800,938 A    9/1998    Watanabe
5,874,182 A *    2/1999    Wilkinson et al. .............. 429/30
(Continued)

FOREIGN PATENT DOCUMENTS

CN    1440085    9/2003

(Continued)

OTHER PUBLICATIONS

Chinese Office Action, with English translation, issued in Chinese Patent Application No. 200580023098.1, mailed Jan. 29, 2010.

(Continued)

*Primary Examiner* — Patrick Ryan
*Assistant Examiner* — Muhammad Siddiquee
(74) *Attorney, Agent, or Firm* — McDermott Will & Emery LLP

(57) ABSTRACT

A solid polymer electrolyte fuel cell includes a membrane electrode assembly having an anode, a cathode arranged facing the anode, and a polyelectrolyte membrane arranged between the anode and the cathode, and a pair of separator plates that are arranged facing each other so as to sandwich the membrane electrode assembly, and have an anode side gas channel for supplying a fuel gas to the anode, and a cathode side gas channel for supplying an oxidant gas to the cathode, formed thereon, wherein the catalyst layer of the anode contains at least one electrode catalyst selected from the group consisting of Pt particles and Pt alloy particles, having a particle diameter of from 6 to 10 nm, the catalyst layer of the anode has a thickness of from 1 to 5 μm, Pt volume density in the catalyst layer of the anode is from 1 to 5 g/cm$^3$, the catalyst layer of the cathode has a thickness of 10 μm or more, and Pt volume density in the catalyst layer of the cathode is from 0.1 to 0.5 g/cm$^3$.

10 Claims, 7 Drawing Sheets

U.S. PATENT DOCUMENTS

| | | | |
|---|---|---|---|
| 5,879,828 A * | 3/1999 | Debe et al. | 429/483 |
| 6,238,534 B1 * | 5/2001 | Mao et al. | 204/416 |
| 2004/0265679 A1 | 12/2004 | Yamamoto | |
| 2005/0008926 A1 | 1/2005 | Yamamoto | |

FOREIGN PATENT DOCUMENTS

| | | |
|---|---|---|
| JP | 6-103992 | 4/1994 |
| JP | 2001-076742 | 3/2001 |
| JP | 2001-118591 | 4/2001 |
| JP | 2001-143714 | 5/2001 |
| JP | 2002-110202 | 4/2002 |
| JP | 2002-289202 | 10/2002 |
| JP | 2003-109608 | 4/2003 |
| JP | 2004-63409 | 2/2004 |
| JP | 2004-146255 | 5/2004 |
| JP | 2004-178814 | 6/2004 |
| JP | 2004-349037 | 12/2004 |
| JP | 2005-32528 | 2/2005 |

OTHER PUBLICATIONS

English Translation of the International Preliminary Report on Patentability issued in International Patent Application No. PCT/JP2005/012866, dated on Jan. 25, 2007.

* cited by examiner

PRIOR ART

PRIOR ART

PRIOR ART

POLYMER ELECTROLYTE FUEL CELL

CROSS-REFERENCE TO RELATED APPLICATIONS

This application is a U.S. national phase application of PCT International Patent Application No. PCT/JP2005/012866 filed Jul. 12, 2005, claiming the benefit of priority of Japanese Patent Application No. 2004-206128 filed Jul. 13, 2005, all of which are incorporated by reference herein in their entirety.

TECHNICAL FIELD

The present invention relates to a polymer electrolyte fuel cell that has designed to suppress deterioration or improve durability, of its polyelectrolyte membrane.

BACKGROUND ART

General constitution of a conventional polymer electrolyte fuel cell stack is explained.

A fuel cell using a polyelectrolyte simultaneously generates electric power and heat by electrochemically reacting a fuel gas containing hydrogen and an oxidant gas containing oxygen, such as air. FIG. 5 is a schematic cross-sectional view for explaining the structure of a unit cell of a solid polymer electrolyte fuel cell. As shown in FIG. 5, a catalyst layer 52 is formed on both sides of a polyelectrolyte membrane 51 selectively transporting hydrogen ion, the catalyst layer 52 comprising a mixture of a catalyst body obtained by having a platinum series metal catalyst carried on a carbon powder, and a hydrogen ion-conductive polyelectrolyte.

At present, polyelectrolyte membranes comprising a perfluorocarbonsulfonic acid (for example, Nafion membrane, a product of Du Pont, and the like) are generally used as the polyelectrolyte membrane 51. A gas diffusion layer 53 is formed on an outer surface of the catalyst layer 52, the gas diffusion layer 53 being a carbon paper having both gas permeability and electron conductivity, for example, such as a carbon paper having been subjected to a water-repellent treatment. Combination of the catalyst layer 52 and the gas diffusion layer 53 is called an electrode 54.

Next, to prevent leakage of a fuel gas and an oxidant gas supplied, to the outside and to prevent the above two kinds of gases from being mixed, a gas sealant or a gasket is provided on the circumference of the electrode sandwiching the polyelectrolyte membrane. This sealant or gasket is previously fabricated together with the electrode and the polyelectrolyte membrane as a unit, and the assembly combining all of those is called MEA (electrolyte membrane electrode assembly) 55.

As shown in FIG. 6, a conductive separator plate 56 for mechanically fixing MEA 55 is provided on the outside of MEA 55. A gas channel 57 for supplying a reaction gas to the face of the electrode and carrying away a produced gas or an excess gas is formed on a contact part of the separator plate 56 and MEA 55. The gas channel can be provided separately from the separator plate, but a system of forming a gas channel by providing grooves on the surface of the separator plate is generally utilized. Thus, by fixing MEA 55 with a pair of the separator plates 56, supplying a fuel gas to one side of the gas channel 57, and supplying an oxidant gas to the other side of the gas channel 57, an electromotive force of about 0.7 to 0.8V can be generated with one unit cell when applying current of a practical current density of from several tens to several hundreds of $mA/cm^2$. A cooling water channel 58 is provided on the face of the separator 56 not facing MEA to circulate cooling water.

What is obtained by fixing MEA 55 with a pair of the separator plates 56 is called a unit cell. However, in general, when a fuel cell is used as a power source, several to several hundreds of volts is required. Therefore, practically, the required number of unit cells are connected in series.

To supply a gas to the gas channel, a piping jig is required, which branches a pipe supplying a gas into the number corresponding to the number of the separator plates used, and directly connects the branched heads to the grooves on the separator. This jig is called a manifold, and in particular, a manifold of the type directly connecting from a pipe for supplying a gas as above is called an external manifold. Further, a manifold having a simpler structure is called an internal manifold. The internal manifold is so designed that through-holes are provided on the separator plate having gas channels formed thereon, an inlet and outlet of the gas channel is extended up to this hole, and a gas is directly supplied to the gas channel through this hole.

FIG. 7 is a schematic cross-sectional view of a fuel cell to which load 512 has been connected, and explains with respect to a gas diffusion layer 501 and a catalyst layer 502, constituting an anode 509 and a cathode 510 of a fuel cell by sandwiching a polyelectrolyte membrane 511 from the both sides. The gas diffusion layer 501 mainly has the following three functions. The first function is a function that diffuses a reaction gas in order to uniformly supply the reaction gas such as a fuel gas or an oxidant gas to a catalyst 503 in a catalyst layer 502 from a gas channel positioned on further outer surface of the gas diffusion layer 501. The second function is a function that quickly discharges water formed by reaction in the catalyst layer 502 into the gas channel. The third function is a function that conducts electrons necessary for reaction or electrons to be generated. That is, high reaction gas penetrability, water discharging properties and electron conductivity are required for the gas diffusion layer 501.

As a conventional general technique, to give gas permeability, a porous structure is given to the gas diffusion layer 501 by using a conductive porous substrate such as a carbon fine powder having developed structure constitution, pore-forming agents, a carbon paper and a carbon cloth, as the gas diffusion layer 501. Further, to give water discharging properties, for example, a water-repellent polymer represented by a fluororesin is dispersed in the gas diffusion layer 501 or the like. Further, to give electron conductivity, the gas diffusion layer 501 is constituted with an electron conductive material such as a carbon fiber 505, a metal fiber and a carbon fine powder.

Next, the catalyst layer 502 mainly has the following four functions. The first function is a function that supplies a reaction gas such as a fuel gas or an oxidant gas, supplied from the gas diffusion layer 501 to a reaction site of the catalyst layer 502. The second function is a function that conducts hydrogen ions necessary for reaction on a catalyst 503 or hydrogen ions to be generated. The third function is a function that conducts electrons necessary for reaction or electrons to be generated. The fourth function is high catalyst performance for speeding an electrode reaction and its wide reaction area. That is, high reaction gas permeability, hydrogen ion conductivity, electron conductivity, and catalyst performance are required for the catalyst layer 502.

As a conventional general technique, to give gas permeability, constituting a gas channel 507 is performed by using a catalyst carrier 504 of carbon fine powder having developed structure constitution or pore-forming agents to give a porous structure to the catalyst layer 502. Further, to give hydrogen ion penetrability, a polyelectrolyte is dispersed in the vicinity of the catalyst 503 in the catalyst layer 502, and hydrogen ion network 508 is formed.

Further, to give electron conductivity, an electron conductive material such as carbon fine powder and carbon fibers is used, as a catalyst carrier 504, thereby constituting an electron channel 506. Further, to improve catalyst performance, a metal catalyst 503 having high reaction activity represented by platinum is carried on carbon fine powder as very fine particles having a particle diameter of several nm, and the catalyst body obtained is highly dispersed in the catalyst layer 502.

DISCLOSURE OF THE INVENTION

Problems that the Invention is to Solve

As the problems of a solid polymer fuel cell, regarding durability deterioration of a fuel cell, there is a concern about disintegration of a polymer membrane, and it is expected that hydrogen peroxide generated by side-reaction on oxygen reduction of a cathode becomes radicals by Fenton reaction (chemical formula 1) or the like to disintegrate the membrane (see, for example, literature "10$^{th}$ Fuel Cell Symposium Lecture, Extended Abstracts, P. 261" (Published May 2003).

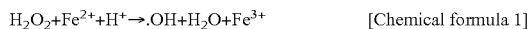

$$H_2O_2 + Fe^{2+} + H^+ \rightarrow \cdot OH + H_2O + Fe^{3+}$$ [Chemical formula 1]

Regarding such a polymer degradation, detailed mechanism is not yet revealed, but there is the possibility that cross leakage of a gas through a polyelectrolyte membrane 111 gives influence.

Cross leakage is a phenomenon in which the problem that as a result of decreasing membrane thickness in order to reduce resistance of a polyelectrolyte membrane part, a fuel gas such as oxygen and hydrogen moves to an opposite polar side through a membrane; it induces problems such as lowering of voltage.

As a method of suppressing cross leakage, a method of increasing membrane thickness of a polyelectrolyte membrane, a method of providing a separate catalyst layer in a membrane, and converting oxygen and hydrogen cross leaked into water in the membrane, and the like are proposed (see, for example, Japan Laid-open 6-103992).

However, those methods had the problems that efficiency of a cell decreases due to the increase of membrane thickness, and increased cost due to installation of a catalyst.

Further, a method of using oxygen cross leaked to an anode, for the removal of CO poisoning of a cathode catalyst is also proposed (see, for example, Japan Laid-open 2001-76742).

In this case, in the case of maintaining at very high voltage near an open-circuit state exceeding 0.9V, there is the problem that Pt catalyst oxidizes and deteriorates.

The present invention has been obtained as a result of investigations in view of the above-mentioned conventional problems, and has an object to provide a high-durable fuel cell that suppresses disintegration deterioration of a polymer membrane, by improving material composition of a catalyst layer of an anode and a cathode.

To achieve the above object, the first aspect of the present invention is a solid polymer electrolyte fuel cell comprising:
a membrane electrode assembly having an anode having a catalyst layer, a cathode having a catalyst layer, arranged facing the anode, and a polyelectrolyte membrane arranged between the anode and the cathode, and a pair of separator plates that are arranged facing each other so as to sandwich the membrane electrode assembly, and having an anode side gas channel for supplying a fuel gas to the anode, and a cathode side gas channel for supplying an oxidant gas to the cathode, formed thereon, wherein the catalyst layer of the anode contains at least one electrode catalyst selected from the group consisting of Pt particles and Pt alloy particles, having a particle diameter of from 6 to 10 nm, the catalyst layer of the anode has a thickness of from 1 to 5 μm, Pt volume density in the catalyst layer of the anode is from 1 to 5 g/cm$^3$, the catalyst layer of the cathode has a thickness of 10 μm or more, and Pt volume density in the catalyst layer of the cathode is from 0.1 to 0.5 g/cm$^3$.

The second aspect of the present invention is the solid polymer electrolyte fuel cell according to the first aspect of the present invention, wherein the catalyst layer of the anode further contains a polyelectrolyte.

The third aspect of the present invention is the solid polymer electrolyte fuel cell according to the second aspect of the present invention, wherein the ratio of the content of the polyelectrolyte in the catalyst layer to the electrode catalyst is from 0.03 to 0.3% by weight.

The fourth aspect of the present invention is the solid polymer electrolyte fuel cell according to the second aspect of the present invention, wherein the catalyst layer of the anode further contains conductive carbon particles.

The fifth aspect of the solid polymer electrolyte fuel cell according to the fourth aspect of the present invention, wherein the ratio of the content of the polyelectrolyte in the catalyst layer to the sum of the electrode catalyst and the conductive carbon particles is from 0.03 to 0.3% by weight.

The sixth aspect of the present invention is the solid polymer electrolyte fuel cell according to the fourth aspect of the present invention, wherein the ratio of the content of the polyelectrolyte in the catalyst layer to the conductive carbon particles is not more than 5% by weight.

The seventh aspect of the present invention is the solid polymer electrolyte fuel cell according to the first aspect of the present invention, wherein the catalyst layer of the anode further contains a polyelectrolyte only.

The eighth aspect of the present invention is the solid polymer electrolyte fuel cell according to the seventh aspect of the present invention, wherein the ratio of the content of the polyelectrolyte in the catalyst layer to the electrode catalyst is from 0.03 to 0.3% by weight.

The ninth aspect of the present invention is the solid polymer electrolyte fuel cell according to the second aspect of the present invention, wherein the electrode catalyst in the catalyst layer of the cathode is carried on the conductive carbon particles.

The tenth aspect of the present invention is the solid polymer electrolyte fuel cell according to the second aspect of the present invention, wherein the electrode catalyst in the catalyst layer of the anode contains only Pt alloy particles.

As a result of investigations on mechanism of durability deterioration due to degradation of a polymer, we have found that influence of oxygen cross leaked to a fuel pole from an oxidant gas side and influence of hydrogen peroxide generated on oxygen reduction in a cathode are large in degradation of a polymer.

As shown in FIG. 4, at the anode 109 side, it was considered that, because the cross leaked oxygen is reduced on the carbon particles, larger amount of hydrogen peroxide generates, thereby inducing disintegration of the membrane. This reaction occurs in a pole vicinity 401 of the polyelectrolyte membrane because the cross leaked oxygen contacts with hydrogen and the electrode at an interface between the polyelectrolyte membrane and the catalyst layer (hereinafter, membrane catalyst interface), the hydrogen peroxide immediately attacks the polyelectrolyte membrane, to cause large deterioration even in a small amount.

However, it was revealed that when hydrogen peroxide contacts with platinum, it immediately decomposes into water and oxygen.

Therefore, by increasing Pt volume density in the catalyst layer 102 of the anode 109, probability of contact between hydrogen peroxide generated and platinum increases, and this enables hydrogen peroxide to decompose easily. Further, in particular, by increasing Pt volume density in the vicinity of the membrane catalyst interface, density of carbon fine particles relatively decreases, and formation of hydrogen peroxide can be prevented. In order that hydrogen sufficiently reaches, a porous structure is important. For this reason, where platinum density increases too much, flow properties of a gas deteriorate. Therefore, the platinum density has the upper limit. The upper limit has also been found in the present invention.

Further, the catalyst layer 102 of the anode ensures gas diffusion, while ensuring reaction area. Therefore, it is more preferable to limit its thickness and a particle diameter of the electrode catalyst contained to the predetermined ranges.

On the other hand, at the cathode side, oxygen reduction reaction proceeds in the overall catalyst layer of the cathode. Therefore, by keeping a reaction field 402 away from the polyelectrolyte membrane, it is possible to suppress diffusion from a formation field into the polyelectrolyte membrane 111, and also to increase the probability of contacting with platinum during diffusion, and decomposing. For this reason, a structure that the catalyst layer 102 of the cathode has a certain extent of thickness, and reaction occurs uniformly therein is preferable. To decrease the total amount of platinum used, the dispersing of it is necessary in a certain range of density.

A first invention has been made on the basis of the above. In the first invention, the expression that "at least one electrode catalyst selected from the group consisting of Pt particles and Pt alloy particles is contained in the catalyst layer of the anode" includes the case of "only at least one electrode catalyst selected from the group consisting of Pt particles and Pt alloy particles, and the catalyst carrier". That is, this means that, for example, the case that a polyelectrolyte membrane material is not contained additionally belongs to the technical range of the present invention.

Further, by suppressing the content of the polyelectrolyte membrane to the sum of the catalyst electrode and the conductive carbon particles in the catalyst layer of the anode, electrical contact between the electrode catalyst and the conductive carbon particles can be maintained well, thereby maintaining an effective catalyst area.

A second invention has been made on the basis of the above.

Further, for high activation of the catalyst, it is necessary to increase a specific surface area of the catalyst particles, and to achieve this, a carbon fine particle carrier having high specific surface area and having an electrode catalyst such as Pt carried thereon is effective.

A third invention has been made on the basis of the above.

Further, even where Pt alloy in place of Pt is contained in the electrode catalyst in the catalyst layer of the anode, so long as Pt volume density is sufficient, performance necessary as a fuel cell can be ensured.

A fourth invention has been made on the basis of the above.

In the each above invention, in the case of not specifying conditions, conductive carbon particles in the catalyst layer of the anode may be carried on the electrode catalyst, or may be mixed with the electrode catalyst. It may be a constitution of not containing conductive carbon particles at all.

Further, it may be Pt alloy catalyst in which the electrode catalyst Pt and other metal elements are alloyed, and the same effect can be obtained. Further, two kinds of electrode catalysts in which Pt catalyst and Pt alloy catalyst are mixed may be used, and the same effect can be obtained.

Advantage of the Invention

According to the present invention, a fuel cell having excellent durability that can suppress deterioration of the polyelectrolyte membrane, and maintains high voltage over a long period of time can be provided.

Figure 1:
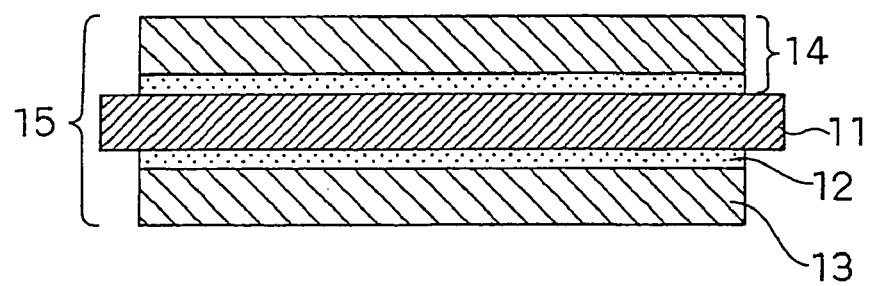
FIG. 1 is a schematic cross-sectional view for explaining the structure of a part of a unit cell of a solid polymer electrolyte fuel cell according to the embodiment of the present invention.

DESCRIPTION OF REFERENCE NUMERALS AND SIGNS 11, 111 Polyelectrolyte membrane
12, 102 Catalyst layer
13, 101 Gas diffusion layer
14 Electrode
15 MEA (Membrane electrode assembly)
16 Separator
17 Gas channel
18 Cooling water channel
103 Catalyst
104 Catalyst carrier
105 Carbon fiber
106 Electron channel
107 Gas channel
108 Hydrogen ion network
109 Anode
110 Cathode
112 Load

BEST FOR CARRYING OUT THE INVENTION

Figure 5:
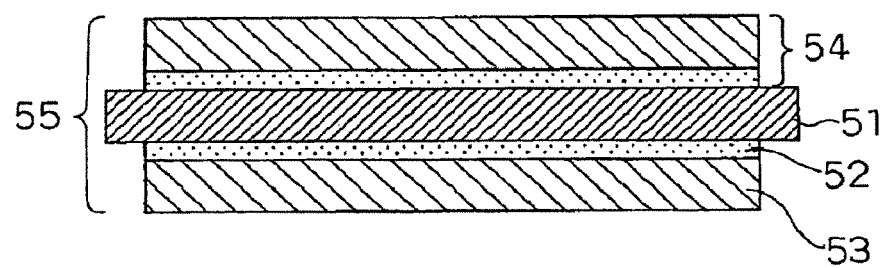
FIG. 5 is a schematic cross-sectional view for explaining a structure of a part of a unit cell of the solid polymer electrolyte fuel cell according to the prior art.
Figure 6:
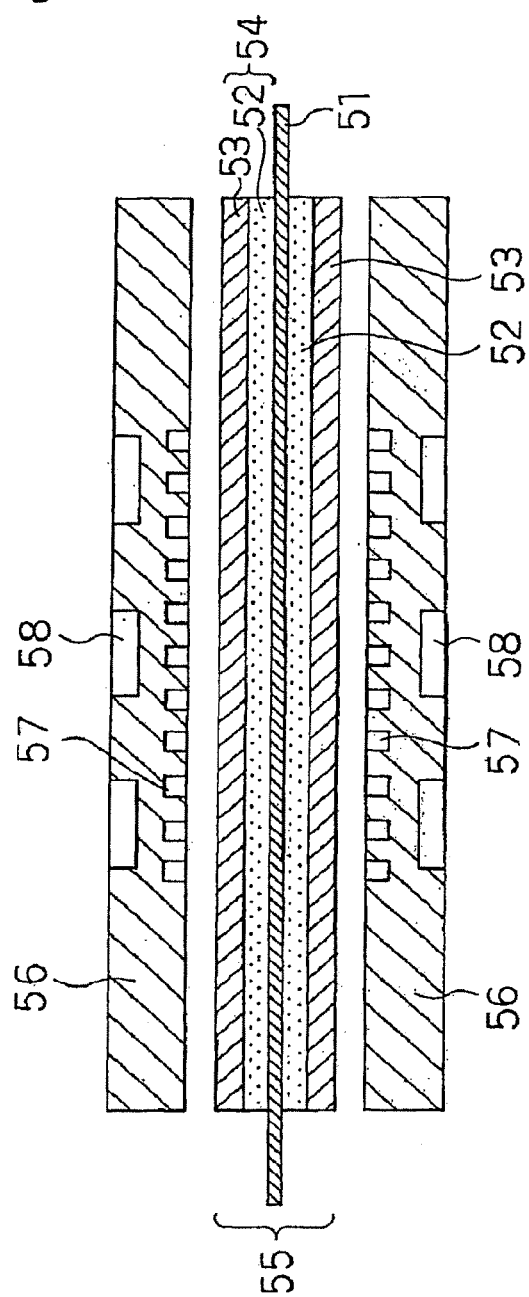
FIG. 6 is a schematic cross-sectional view for explaining a structure of a unit cell of the solid polymer electrolyte fuel cell according to the prior art.
Figure 7:
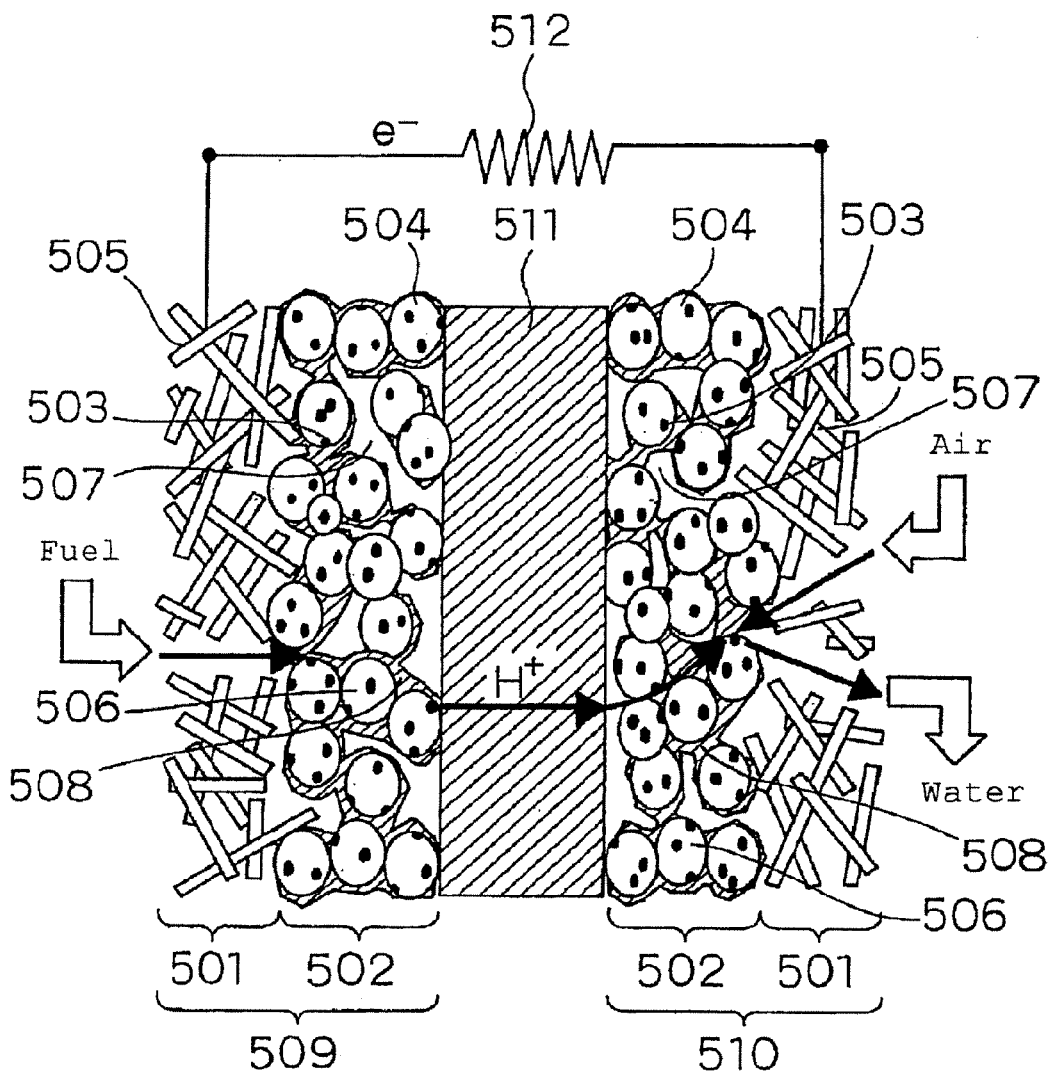
FIG. 7 is a cross-sectional view for showing in detail a constitution of the unit cell according to the prior art.

A general constitution of the polymer electrolyte fuel stack in the embodiment of the present invention is explained by referring to FIGS. 1 to 4. The same reference numerals and symbols as used in FIGS. 5 to 7 were applied to those which are the same as or corresponding to those used parts in the conventional embodiments shown in FIGS. 5 to 7.

The fuel cell using a polyelectrolyte simultaneously generates electric power and heat by electrochemically reacting a fuel gas containing hydrogen and an oxidant gas containing oxygen, such as air.

FIG. 1 is a schematic cross-sectional view for explaining the structure of a unit cell in a solid polymer electrolyte fuel cell. As shown in FIG. 1, a catalyst layer 12 is formed on both sides of a polyelectrolyte membrane 11 which selectively transports hydrogen ion, the catalyst layer being a mixture of a catalyst body obtained by having a platinum series metal catalyst carried on carbon powder and a hydrogen ion-conductive polyelectrolyte.

At present, polyelectrolyte membranes comprising a perfluorocarbonsulfonic acid (for example, Nafion membrane, a product of Du Pont, and the like) are generally used as the polyelectrolyte membrane 11. A gas diffusion layer 13 is formed on an outer surface of the catalyst layer 12 the gas diffusion layer 13 being a carbon paper having both a gas permeability and an electron conductivity, for example, such as a carbon paper having been subjected to a water-repellent treatment. Combination of the catalyst layer 12 and the gas diffusion layer 13 is called an electrode 14.

Next, to prevent a fuel gas or oxidant gas supplied, from being leaked to the outside and to prevent the above two kinds of gases from being mixed, a gas sealant or a gasket is provided on the circumference of the electrode through the polyelectrolyte membrane. This sealant or gasket is previously fabricated together with the electrode and the polyelectrolyte membrane as a unit, and the assembly combining all of those is called MEA (electrolyte membrane electrode assembly) 15.

Figure 2:
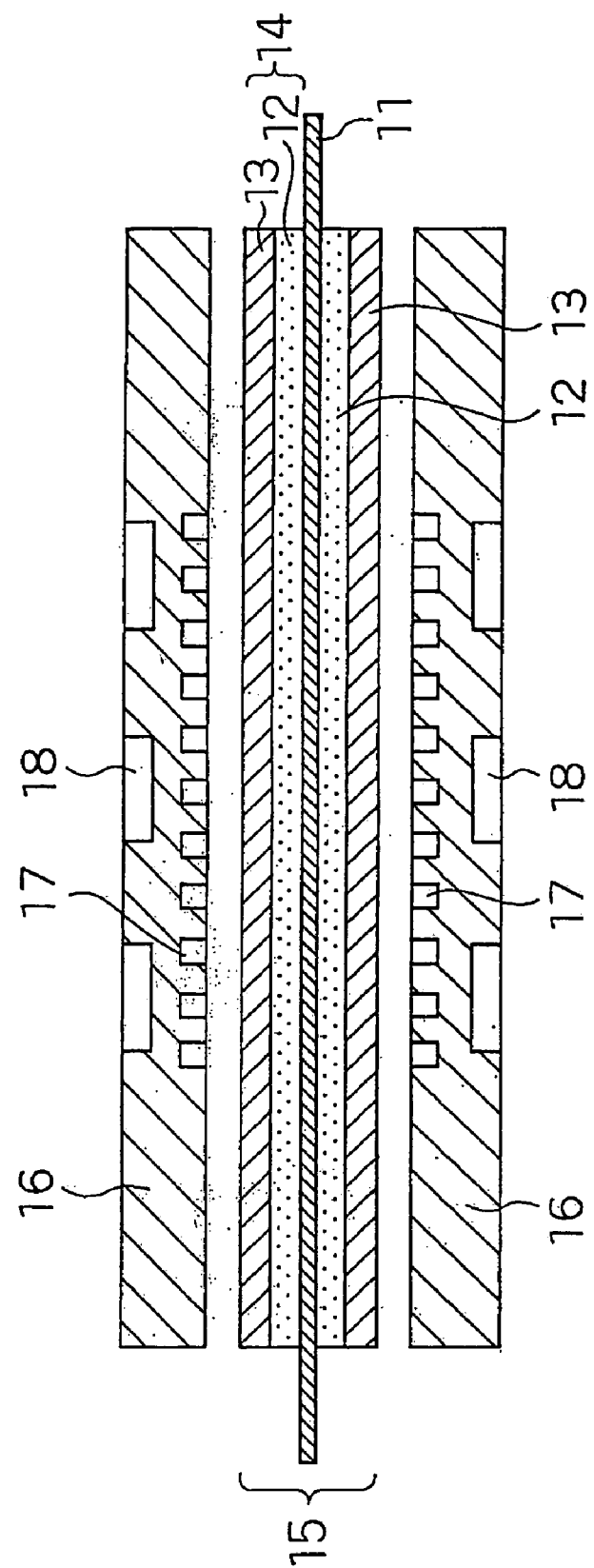
FIG. 2 is a schematic cross-sectional view for explaining a structure of a unit cell of a solid polymer electrolyte fuel cell according to the embodiment of the present invention.

As shown in FIG. 2, a conductive separator plate 16 for mechanically fixing MEA 15 is provided on the outside of MEA 15. A gas channel 17 for supplying a reaction gas to the face of the electrode and carrying away a produced gas or an excess gas is formed on a contact part of the separator plate 16 and MEA 15. The gas channel 17 formed at an anode 109 side described hereinafter constitutes an anode side gas channel of the present invention, and the gas channel 17 formed at a cathode 110 side constitutes a cathode side gas channel of the present invention. The gas channel 17 can be provided separately from the separator plate, but a system of forming the gas channel 17 by providing grooves on the surface of the separator plate is general. Thus, by fixing MEA 15 with a pair of the separator plates 16, supplying a fuel gas to the gas channels at one side, and supplying an oxidant gas to the gas channels at the other side, electromotive force of about 0.7 to 0.8V can be generated with one unit cell when applying current of a practical current density of from several tens to several hundreds of mA/cm$^2$. A cooling water channel 18 is provided on the face of the separator 16 not facing MEA to circulate cooling water.

What is obtained by fixing MEA 15 with a pair of the separator plates 16 is called a unit cell. However, in general, when a fuel cell is used as a power source, several to several hundreds of volt is required. Therefore, practically, the required number of unit cells are connected in series.

To supply a gas to the gas channel, a piping jig is required, which branches a pipe supplying a gas into the number corresponding to the number of the separator plates 16 used, and directly connects the branched heads to the grooves on the separator. This jig is called a manifold, and in particular, a manifold of the type directly connecting from a pipe for supplying a gas as above is called an external manifold. Further, a manifold having a simpler structure is called an internal manifold. The internal manifold is so designed that through-holes are provided on the separator plate having gas channels formed thereon, an inlet and outlet of the gas channel are extended up to this hole, and a gas is directly supplied to the gas channel through this hole.

Figure 3:
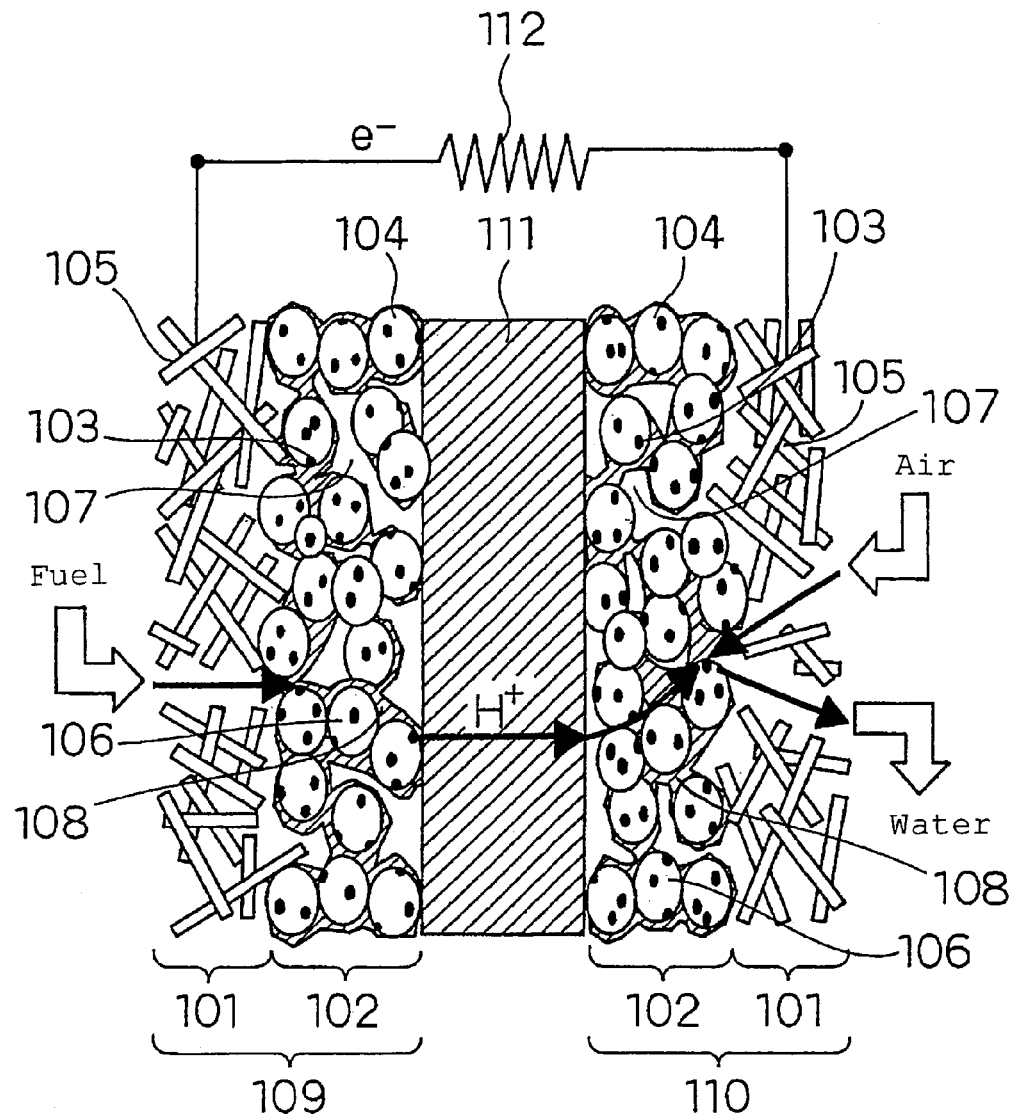
FIG. 3 is a cross-sectional view for showing in detail a constitution of a unit cell according to the embodiment of the present invention.

FIG. 3 is a schematic cross-sectional view of a fuel cell to which load 112 has been connected, and explains with respect to a gas diffusion layer 101 and a catalyst layer 102, constituting an anode 109 and a cathode 110 of a fuel cell by sandwiching a polyelectrolyte membrane 111 from both sides. The gas diffusion layer 101 mainly has the following three functions. The first function is a function that diffuses a reaction gas in order to uniformly supply the reaction gas such as a fuel gas or an oxidant gas to a catalyst 103 in a catalyst layer 102 from a gas channel positioned on further outer surface of the gas diffusion layer 101. The second function is a function that quickly discharges water formed by reaction in the catalyst layer 102 into the gas channel. The third function is a function that conducts electrons necessary for reaction or electrons to be generated. That is, high reaction gas permeability, water discharging properties and electron conductivity are required for the gas diffusion layer 101.

As a conventional general technique, to give gas permeability, the gas diffusion layer 101 is made to have a porous structure by using a conductive porous substrate such as a carbon fine powder having developed structure construction, pore-forming agents, a carbon paper and a carbon cloth, as the gas diffusion layer 101. Further, to give water discharging properties, for example, a water-repellent polymer represented by a fluororesin is dispersed in the gas diffusion layer 101 or the like. Further, to give electron conductivity, the gas diffusion layer 101 is constituted with an electron conductive material such as a carbon fiber 105, a metal fiber and carbon fine powder.

Next, the catalyst layer 102 mainly has the following four functions. The first function is a function that supplies a reaction gas such as a fuel gas or an oxidant gas, supplied from the gas diffusion layer 101 to a reaction site of the catalyst layer 102. The second function is a function that conducts hydrogen ions necessary for reaction on the catalyst 103 or hydrogen ions to be generated. Further, the third function is a function that conducts electrons necessary for reaction or electrons to be generated. The fourth function is high catalyst performance for speeding up an electrode reaction and its wide reaction area. That is, high reaction gas permeability, hydrogen ion conductivity, electron conductivity, and catalyst performance are required for the catalyst layer 102.

As a conventional general technique, to give gas permeability, constituting a gas channel 107 is performed by using a catalyst carrier 104 of carbon fine powder having developed structure construction or pore-forming agents to give a porous structure to the catalyst layer 102. Further, to give hydrogen ion permeability, a polyelectrolyte is dispersed in the vicinity of the catalyst 103 in the catalyst layer 102, and hydrogen ion network 108 is formed.

Further, to give electron conductivity, an electron conductive material such as carbon fine powder and carbon fibers is used, as a catalyst carrier 104, thereby constituting an electron channel 106. Further, to improve catalyst performance, a metal catalyst 103 having high reaction activity represented by platinum is carried on carbon fine powder as very fine particles having a particle diameter of several nm, and the catalyst body obtained is highly dispersed in the catalyst layer 102.

The present invention has the characteristic in the composition of the respective catalyst layer 102 of the anode 109 and the cathode 110 in the above constitution. That is, at least one electrode catalyst selected from the group consisting of Pt particles and Pt alloy particles, having a particle diameter of from 6 to 10 nm is contained in the catalyst layer 102 of the anode 109. The catalyst layer 102 has a thickness of from 1 to 5 μm, and Pt volume density therein is from 1 to 5 $g/cm^3$. On the other hand, the cathode 110 is characterized in that the catalyst layer 102 has a thickness of 10 μm or more, and Pt volume density therein is from 0.1 to 0.5 $g/cm^3$.

Figure 4:
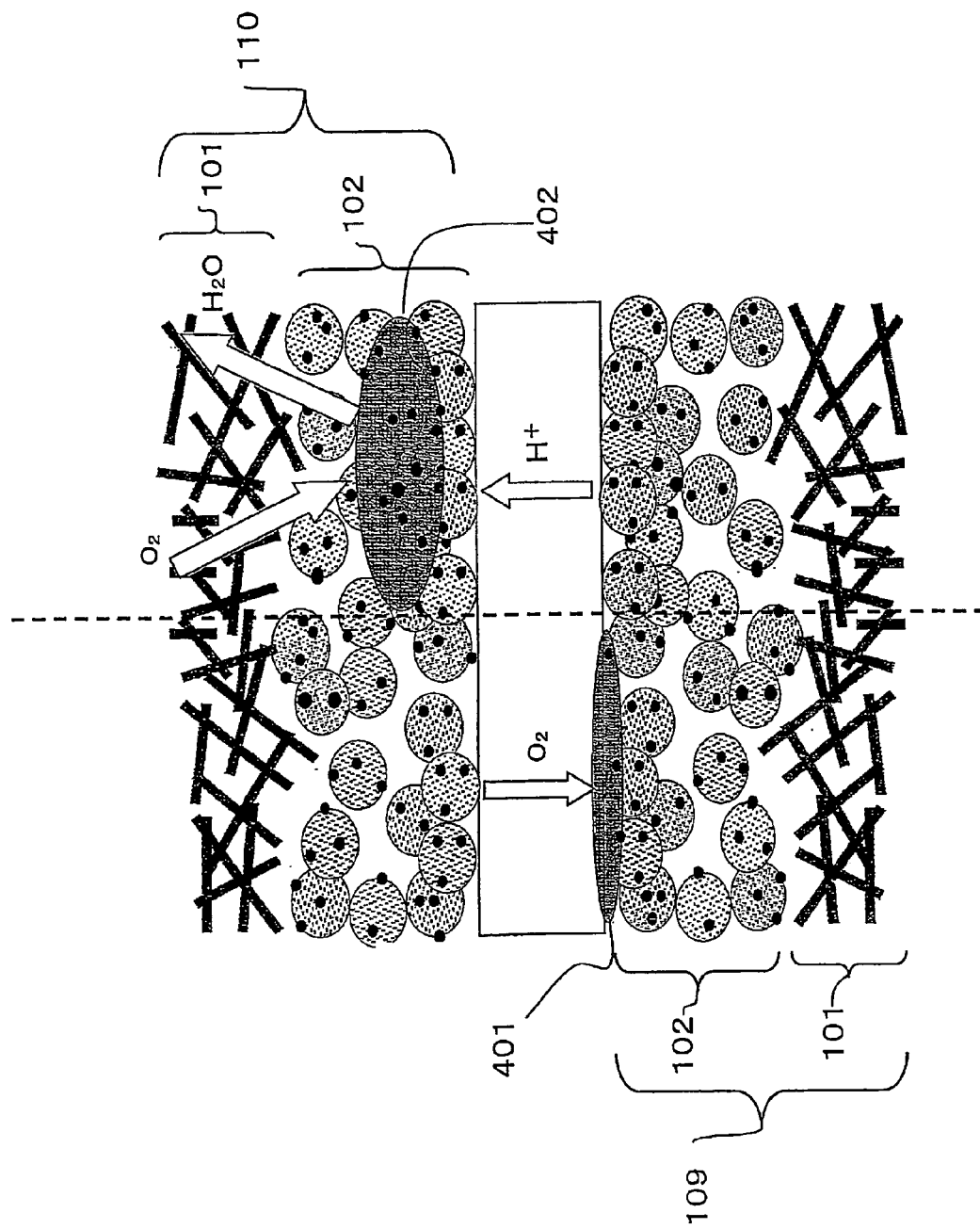
FIG. 4 is a view for explaining a mechanism that a polyelectrolyte membrane deteriorates.

By the above constitution, the following effect is obtained. Influence of oxygen cross leaked to a fuel pole from an oxidant gas side and influence of hydrogen peroxide generated on oxygen reduction in a cathode are large in degradation of a polymer. In detail, as shown in FIG. 4, it was considered that, regarding the anode 109 side, the cross leaked oxygen is reduced on the carbon particles, larger amount of hydrogen peroxide generates, thereby inducing disintegration of the membrane. This reaction occurs at a pole vicinity 401 of the polyelectrolyte membrane because the cross leaked oxygen contacts with hydrogen and the electrode at an interface between the polyelectrolyte membrane and the catalyst layer (hereinafter, membrane catalyst interface), hydrogen peroxide generates, and its hydrogen peroxide immediately attacks the polyelectrolyte membrane, to cause large deterioration even in a small amount.

However, the inventors of the present invention have found that hydrogen peroxide immediately decomposes into water and oxygen when contacting with platinum. Based on this finding, the decomposition is made easy by increasing Pt volume density in the catalyst layer 102 of the anode 109, to increase probability of contact between hydrogen peroxide and platinum. Further, in particular, by increasing Pt volume density in the vicinity of the membrane catalyst interface, density of carbon fine particles relatively decreases, and formation of hydrogen peroxide can be prevented. In order that hydrogen sufficiently reaches, a porous structure is important. For this reason, where platinum density increases too much, flow properties of a gas deteriorate. Therefore, the platinum density has the upper limit. The upper limit has also been found in the present invention.

Further, the thickness of and a particle diameter of the electrode catalyst contained the catalyst layer 102 of the anode is limited to the predetermined ranges in order to ensures gas diffusion, while ensuring reaction area.

On the other hand, at the cathode side, oxygen reduction reaction proceeds in the overall catalyst layer of the cathode. Therefore, by keeping a reaction field 402 away from the polyelectrolyte membrane, it is possible to suppress diffusion from a formation field into the polyelectrolyte membrane 111, and also to increase the probability of contacting with platinum during diffusion, and decomposing. For this reason, a structure that the catalyst layer 102 of the cathode has a certain extent of thickness, and reaction occurs uniformly therein is preferable. To decrease the total amount of platinum used, the dispersing of it is made in a certain range of density.

Further, a further characteristic of the present invention is that the polyelectrolyte and conductive carbon particles are contained in the catalyst layer 102 of the anode 109, and the content of the polyelectrolyte to the sum of the electrode catalyst and the conductive carbon particles in the catalyst layer 102 is from 0.03 to 0.3% by weight. By this, electrical contact between the electrode catalyst and the conductive carbon particles can be maintained well, thereby maintaining an effective catalyst area.

Further, a further characteristic of the present invention is a constitution in which the electrode catalyst in the catalyst layer 102 of the cathode 110 is carried on the conductive carbon particles. By having the electrode catalyst carried on a carbon fine particle carrier having high specific surface area, specific surface area of catalyst particles can be increased, thereby enabling high activation of the catalyst.

Further, a further characteristic of the present invention is that the electrode catalyst in the catalyst layer of the anode contains only Pt alloy particles. By this, so long as Pt volume density is sufficient, performance necessary as a fuel cell can be ensured.

EXAMPLE

Examples of the present invention are explained below by referring to the drawings.
[Preparation of MEA]

An acetylene black (DENKA BLACK, a product of Denki Kagaku Kogyo K.K., particle size: 35 nm) which is a carbon powder was mixed with an aqueous dispersion of a polytetrafluoroethylene (PTFE) (D1, a product of Daikin Industries, Ltd.) to prepare a water-repellent ink containing 20% by weight of PTFE in dry weight. This ink was applied to a carbon cloth (CARBOLON GF-20-31E, a product of Nippon Carbon Co.) which is a substrate of a gas diffusion layer allowing it to impregnate, and then cloth is heat-treated at 300° C. using a hot air dryer to form a gas diffusion layer 13 (about 200 μm).

Next, preparation method of a catalyst layer 12 is explained.

In the case of preparing the catalyst layer 12 having a small content of conductive carbon particles, about 70% by weight is the upper limit when metal fine particles are carried on a carrier carbon. Therefore, to investigate a composition of catalyst amount more than such a limit, a mixed catalyst layer of Pt fine particles and conductive carbon fine particles was investigated.

HiSPEC 1000 (particle A) manufactured by Johnson Matthey Fuel Cell Japan Ltd. as Pt fine particles was mixed with a ketjen black (Ketjen Black EC, a product of Ketjen Black International Ltd., particle diameter 30 nm) in various proportions, and a perfluorocarbonsulfonic acid ionomer (5 wt % Nafion dispersion, a product of Aldrich Co., USA) which is a hydrogen ion-conductive material and a binder was added, followed by molding to obtain a catalyst layer. A size of HiSPEC 1000 particle is 6 nm, and a specific surface area by BET is 28 $m^2/g$.

Further, this powder was heat treated at high temperature, and various kinds of catalyst particles with various sizes were prepared and investigated. A size of the crystallite investigated was about 10 nm and 15 nm.

Further, to examine influence of Pt alloying in an anode, a catalyst layer using Pt/Ru alloy fine powder (HiSPEC 6000, a product of Johnson Matthey Fuel Cell Ltd.) was also prepared. Atomic ratio of Pt and Ru in this fine particle is 1:1, crystallite size is 2.8 nm, and BET specific surface area is 72 $m^2/g$.

As a catalyst layer having a catalyst carried on carbon fine particles, a catalyst powder obtained by having Pt carried on a ketjen black which is a carbon powder was mixed with a polyelectrolyte solution, and the mixture obtained was molded to form a catalyst layer 12.

The gas diffusion layer 13 and catalyst layer 12 obtained above were bonded to both sides of a polyelectrolyte membrane (Nafion 112 membrane, a product of Du Pont Co.,) to produce a membrane electrode assembly (MEA) 15 having the structure shown in FIG. 1. This is the same constitution as shown in FIG. 3, and according to need, it is explained using the symbols in FIG. 3 below.

Next, a gasket plate made of a rubber was bonded to the outer circumference of a polyelectrolyte membrane 11 of MEA 15 prepared above, and manifold holes for flowing a fuel gas and an oxidant gas were formed.

On the other hand, two conductive separator plates each made of a graphite plate impregnated with a phenolic resin, having outer dimensions of 10 cm×10 cm×1.3 mm, and having a gas channel with a width of 0.9 mm and a depth of 0.7 mm were provided. One separator having the gas channel 17 as an oxidant gas channel formed thereon was laminated on one side of MEA 15, and the other separator plate 16 having the gas channel 17 as a fuel gas channel formed thereon was laminated on the other side, to obtain a unit cell shown in FIG. 2. A collector plate made of stainless steel, an insulating plate of an electrically insulating material, and an end plate were arranged at each of both ends of the unit cell, and the whole was fixed with a fastening rod. The fastening pressure in this case was 10 kgf/cm$^2$ per area of the separator. Thus, a fuel cell was prepared.

[Evaluation Test]

Hydrogen as a fuel gas and air as an oxidant gas were supplied to the respective electrode of the fuel cell obtained above, and unless otherwise particularly specified, discharge test was conducted under the conditions of cell temperature of 70° C., fuel gas utilization factor (Uf) of 70% and air utilization factor (Uo) of 40%. The fuel gas and air were moistened so as to have a dew point of 65° C. and 65° C., respectively.

In the state of continuously supplying air and fuel gas, continuous operation was conducted at a current density of 200 mA/cm$^2$, and initial cell voltage and deterioration rate of voltage were measured. Further, at the same time, the amount of fluoride ion contained in exhaust gas and drain water was determined with an ion chromatography (Ion Analyzer IA-100, a product of Toa DKK Co.). Because it is considered that the fluoride ion generates when a polyelectrolyte degrades, this amount was used as a measure of polymer degradation amount. Specifically, a cell was operated for 500 hours, and the average F ion elution rate during the operation was compared.

Further, the ratio of voltage at the time when the utilization factor of hydrogen gas of the anode 109 was changed to 95%, to discharge voltage at the time when the utilization factor of hydrogen gas of the anode 109 was changed to 70% was measured. It shows that inhibition of gas diffusion due to clogging of water is difficult to occur as lowering of the voltage at hydrogen utilization factor of 95% is small.

The measurement data are an average value of 10 unit cells.

Example 1

At first, Pt volume density in the respective catalyst layer 102 of the anode 109 and the cathode 110 was changed, and while maintaining the Pt volume density in the catalyst layer 102 of the cathode 110 constant, the catalyst layer thickness of the cathode 110 was investigated by changing the coating amount of the catalyst.

Where Pt density in the catalyst layer 102 of the anode 109 was 5 and 6 g/cm$^3$, catalyst layers were prepared using Pt powder having a size of crystallite of 10 and 15 nm. Further, where Pt density was 0.8 and 1 g/cm$^3$, they were prepared by adding 5 and 6% of a carbon powder (conductive carbon fine particles) to Pt powder of 10 nm, respectively.

As the catalyst layer 102 of the cathode 110, catalysts having a mixing weight % to Pt of the carbon powder of 80, 70, 15 and 10% were used to Pt volume density of 0.6, 0.5, 0.1 and 0.08 g/cm$^3$, respectively, and the coating amount was adjusted to change the thickness.

Further, investigations were made on a catalyst loading of the catalyst layer 102 and a thickness of the catalyst layer 102, of the anode 109, and a particle diameter, i.e., a size, of Pt catalyst fine particle, and the thickness of the catalyst layer 102 was controlled by changing the catalyst loading.

While changing the above conditions, a discharge voltage of the fuel cell, an average discharge rate of fluoride ion when operating for 500 hours and a discharge voltage ratio when changing the fuel utilization factor were measured. The discharge voltage ratio to the change of the fuel utilization factor is a necessary characteristic particularly in the case of operating the fuel cell under high moistening condition, and may appropriately be selected according to design of the system.

The measurement results are shown in Tables 1 to 4. Note that Table 1 showed the case of changing only the conditions of a catalyst layer thickness and Pt volume density of the catalyst investigated, and Tables 2 to 4 showed the conditions that a thickness of the catalyst layer 102 and a crystallite size of Pt fine particle were changed in the mixing ratio of carbon and the mixing ratio of a polymer resin.

TABLE 1

| Pt volume density in anode catalyst layer g/cm$^3$ | Pt volume density in cathode catalyst layer g/cm$^3$ | Cathode catalyst layer thickness μm | Discharge voltage mV | Fluoride ion discharge rate μg/day/cm$^2$ | Discharge voltage ratio Uf |
|---|---|---|---|---|---|
| 6 | 0.6 | 8 | 720 | 0.33 | 93 |
|   |     | 10 | 726 | 0.3 | 93 |
|   |     | 15 | 730 | 0.28 | 93 |
|   | 0.5 | 8 | 722 | 0.27 | 93 |
|   |     | 10 | 734 | 0.21 | 93 |
|   |     | 15 | 737 | 0.18 | 93 |
|   | 0.1 | 8 | 717 | 0.26 | 93 |
|   |     | 10 | 728 | 0.24 | 93 |
|   |     | 15 | 734 | 0.22 | 93 |
|   | 0.08 | 8 | 710 | 0.35 | 93 |
|   |     | 10 | 724 | 0.31 | 93 |
|   |     | 15 | 728 | 0.29 | 93 |
| 5 | 0.6 | 8 | 720 | 0.35 | 95 |
|   |     | 10 | 726 | 0.34 | 95 |
|   |     | 15 | 730 | 0.32 | 95 |
|   | 0.5 | 8 | 723 | 0.31 | 95 |
|   |     | 10 | 737 | 0.28 | 95 |
|   |     | 15 | 742 | 0.24 | 95 |
|   | 0.1 | 8 | 721 | 0.33 | 95 |
|   |     | 10 | 734 | 0.3 | 95 |
|   |     | 15 | 740 | 0.28 | 95 |
|   | 0.08 | 8 | 711 | 0.38 | 95 |
|   |     | 10 | 723 | 0.35 | 95 |
|   |     | 15 | 727 | 0.34 | 95 |
| 1 | 0.6 | 8 | 719 | 0.35 | 97 |
|   |     | 10 | 727 | 0.32 | 97 |
|   |     | 15 | 732 | 0.31 | 97 |
|   | 0.5 | 8 | 725 | 0.28 | 97 |
|   |     | 10 | 738 | 0.23 | 97 |
|   |     | 15 | 742 | 0.2 | 97 |
|   | 0.1 | 8 | 721 | 0.29 | 97 |
|   |     | 10 | 733 | 0.26 | 97 |
|   |     | 15 | 739 | 0.24 | 97 |
|   | 0.08 | 8 | 713 | 0.35 | 97 |
|   |     | 10 | 726 | 0.33 | 97 |
|   |     | 15 | 732 | 0.32 | 97 |
| 0.8 | 0.6 | 8 | 718 | 0.42 | 97 |
|   |     | 10 | 725 | 0.4 | 97 |
|   |     | 15 | 729 | 0.39 | 97 |

TABLE 1-continued

| Pt volume density in anode catalyst layer g/cm³ | Pt volume density in cathode catalyst layer g/cm³ | Cathode catalyst layer thickness μm | Discharge voltage mV | Fluoride ion discharge rate μg/day/cm² | Discharge voltage ratio Uf |
|---|---|---|---|---|---|
| | 0.5 | 8 | 723 | 0.45 | 97 |
| | | 10 | 735 | 0.43 | 97 |
| | | 15 | 739 | 0.4 | 97 |
| | 0.1 | 8 | 720 | 0.55 | 97 |
| | | 10 | 731 | 0.52 | 97 |
| | | 15 | 738 | 0.49 | 97 |
| | 0.08 | 8 | 712 | 0.54 | 97 |
| | | 10 | 725 | 0.52 | 97 |
| | | 15 | 730 | 0.48 | 97 |

TABLE 2

| Pt volume density in anode catalyst layer g/cm³ | Pt volume density in cathode catalyst layer g/cm³ | Weight ratio of catalyst (Pt catalyst + carbon) and electrolyte resin in anode catalyst layer % | Thickness of anode catalyst layer μm | Alloy fine particle diameter nm | Discharge voltage mV | Fluoride ion discharge rate μg/day/cm² | Discharge voltage ratio Uf |
|---|---|---|---|---|---|---|---|
| 3 | 0.5 | 0.03 | 0.5 | 6 nm | 709 | 0.35 | 97 |
| | | | | 10 nm | 707 | 0.37 | 97 |
| | | | | 15 nm | 703 | 0.38 | 95 |
| | | | 1 | 6 nm | 735 | 0.25 | 98 |
| | | | | 10 nm | 731 | 0.28 | 98 |
| | | | | 15 nm | 726 | 0.29 | 96 |
| | | | 5 | 6 nm | 737 | 0.24 | 97 |
| | | | | 10 nm | 734 | 0.27 | 95 |
| | | | | 15 nm | 729 | 0.29 | 93 |
| | | | 7 | 6 nm | 740 | 0.21 | 94 |
| | | | | 10 nm | 735 | 0.23 | 91 |
| | | | | 15 nm | 731 | 0.26 | 89 |

TABLE 3

| Pt volume density in anode catalyst layer g/cm³ | Pt volume density in cathode catalyst layer g/cm³ | Weight ratio of catalyst (Pt catalyst + carbon) and electrolyte resin in anode catalyst layer % | Thickness of anode catalyst layer μm | Alloy fine particle diameter nm | Discharge voltage mV | Fluoride ion discharge rate μg/day/cm² | Discharge voltage ratio Uf |
|---|---|---|---|---|---|---|---|
| 2 | 0.4 | 0.15 | 0.5 | 6 nm | 720 | 0.38 | 97 |
| | | | | 10 nm | 717 | 0.4 | 97 |
| | | | | 15 nm | 715 | 0.42 | 95 |
| | | | 1 | 6 nm | 742 | 0.15 | 98 |
| | | | | 10 nm | 737 | 0.18 | 98 |
| | | | | 15 nm | 729 | 0.23 | 96 |
| | | | 5 | 6 nm | 745 | 0.13 | 97 |
| | | | | 10 nm | 742 | 0.17 | 95 |
| | | | | 15 nm | 738 | 0.2 | 93 |
| | | | 7 | 6 nm | 746 | 0.13 | 94 |
| | | | | 10 nm | 744 | 0.18 | 91 |
| | | | | 15 nm | 741 | 0.22 | 89 |

TABLE 4

| Pt volume density in anode catalyst layer g/cm³ | Pt volume density in cathode catalyst layer g/cm³ | Weight ratio of catalyst (Pt catalyst + carbon) and electrolyte resin in anode catalyst layer % | Thickness of anode catalyst layer μm | Alloy fine particle diameter nm | Discharge voltage mV | Fluoride ion discharge rate μg/day/cm² | Discharge voltage ratio Uf |
|---|---|---|---|---|---|---|---|
| 1 | 0.3 | 0.3 | 0.5 | 6 nm | 712 | 0.39 | 97 |
| | | | | 10 nm | 709 | 0.42 | 96 |
| | | | | 15 nm | 705 | 0.45 | 94 |
| | | | 1 | 6 nm | 737 | 0.24 | 98 |
| | | | | 10 nm | 730 | 0.27 | 98 |

TABLE 4-continued

| Pt volume density in anode catalyst layer g/cm³ | Pt volume density in cathode catalyst layer g/cm³ | Weight ratio of catalyst (Pt catalyst + carbon) and electrolyte resin in anode catalyst layer % | Thickness of anode catalyst layer μm | Alloy fine particle diameter nm | Discharge voltage mV | Fluoride ion discharge rate μg/day/cm² | Discharge voltage ratio Uf |
|---|---|---|---|---|---|---|---|
|  |  |  |  | 15 nm | 727 | 0.31 | 97 |
|  |  |  | 5 | 6 nm | 740 | 0.21 | 97 |
|  |  |  |  | 10 nm | 732 | 0.23 | 96 |
|  |  |  |  | 15 nm | 728 | 0.24 | 94 |
|  |  |  | 7 | 6 nm | 742 | 0.21 | 93 |
|  |  |  |  | 10 nm | 735 | 0.24 | 91 |
|  |  |  |  | 15 nm | 730 | 0.25 | 89 |

As shown in Table 1, in the cell wherein Pt volume density of the anode 109 is from 1 to 5 g/cm³, Pt volume density of the cathode 110 is from 0.1 to 0.5 g/cm³, and the catalyst layer thickness of the cathode 110 is 10 nm or more, excellent cell characteristics were obtained such that the discharge voltage is 730 mV or more, the discharge amount of fluoride ion is 0.3 μg/day/cm², thus being excellent in durability to degradation of a polymer, and the discharge volume ratio to hydrogen utilization factor is 95% or higher.

Further, as shown in Tables 2 to 4, in the case of further adding the conditions that the thickness of the catalyst layer 102 of the anode 109 is 6 μm or less and the particle diameter is 10 nm or less, in addition to the conditions of only Pt volume density and catalyst layer thickness in Table 1, excellent cell characteristics could be ensured such that the discharge voltage is 730 mV or more, the discharge amount of fluoride ion is 0.3 μg/day/cm², thus being excellent in durability to degradation of a polymer, and the discharge volume ratio to hydrogen utilization factor is 95% or higher.

Example 2

Investigations were made on composition of the conductive carbon fine particles and the catalyst fine particles in the catalyst layer, and the mixing ratio of the catalyst fine particles and the polyelectrolyte in the catalyst layer of the anode 109. The mixing ratio of Pt fine particles and a ketjen black used as the conductive carbon fine particles was changed to 0, 5 and 7% in the catalyst of the anode 109, and to the respective embodiment, the mixing ratio of Pt fine particles and ketjen black was changed to 25, 30, 60 and 65% in the catalyst layer 102 of the cathode 110.

The amount of the conductive resin added to the catalyst layer 102 of the anode 109 was adjusted such that the ratio of weight of a catalyst (the sum of Pt or Pt alloy catalyst and carbon) and weight of an electrolyte resin ($W_{poly}/W_{cat}$) was 0.02, 0.03, 0.3 and 0.35%. Further, the catalyst amount was adjusted such that 0.7 mg of Pt per 1 cm² of the catalyst layer 102 was held in both the anode 109 and the cathode 110.

Conditions of the catalyst layer investigated above, discharge voltage, an average discharge rate of fluoride ion when operating a cell for 500 hours, and a voltage ratio when changing the fuel utilization factor are shown in Table 5. Although not shown in Table 5, regarding the catalyst layer 102 of the anode 109, measurements were made on the conditions that its thickness is 1 or 5 μm, Pt particle diameter is 6 or 10 nm, and the thickness of the catalyst layer 102 of the cathode 110 is 10, 12, 20 and 22 μm, corresponding to the mixing ratio of Pt fine particle and a kejten black in the catalyst layer 102 of the cathode 110 of 25, 30, 60 and 65%, respectively.

TABLE 5

| Pt volume density in anode catalyst layer g/cm³ | Pt volume density in cathode catalyst layer g/cm³ | Weight ratio of catalyst (Pt catalyst + carbon) and electrolyte resin in anode catalyst layer % | Discharge voltage mV | Fluoride ion discharge rate μg/day/cm² | Discharge voltage ratio Uf |
|---|---|---|---|---|---|
| 3 | 0.6 | 0.02 | 708 | 0.37 | 98 |
|  |  | 0.03 | 729 | 0.35 | 97 |
|  |  | 0.3 | 728 | 0.32 | 97 |
|  |  | 0.35 | 725 | 0.3 | 95 |
|  | 0.5 | 0.02 | 714 | 0.27 | 98 |
|  |  | 0.03 | 735 | 0.25 | 98 |
|  |  | 0.3 | 732 | 0.21 | 97 |
|  |  | 0.35 | 730 | 0.2 | 95 |
|  | 0.3 | 0.02 | 721 | 0.26 | 98 |
|  |  | 0.03 | 740 | 0.23 | 98 |
|  |  | 0.3 | 738 | 0.18 | 97 |
|  |  | 0.35 | 735 | 0.17 | 95 |
|  | 0.1 | 0.02 | 713 | 0.34 | 98 |
|  |  | 0.03 | 731 | 0.32 | 97 |
|  |  | 0.3 | 730 | 0.31 | 97 |
|  |  | 0.35 | 723 | 0.29 | 95 |

TABLE 5-continued

| Pt volume density in anode catalyst layer g/cm³ | Pt volume density in cathode catalyst layer g/cm³ | Weight ratio of catalyst (Pt catalyst + carbon) and electrolyte resin in anode catalyst layer % | Discharge voltage mV | Fluoride ion discharge rate μg/day/cm² | Discharge voltage ratio Uf |
|---|---|---|---|---|---|
| 1 | 0.6 | 0.02 | 709 | 0.4 | 98 |
|   |   | 0.03 | 731 | 0.36 | 97 |
|   |   | 0.3 | 730 | 0.32 | 97 |
|   |   | 0.35 | 727 | 0.31 | 95 |
|   | 0.5 | 0.02 | 716 | 0.3 | 98 |
|   |   | 0.03 | 738 | 0.29 | 98 |
|   |   | 0.3 | 735 | 0.25 | 97 |
|   |   | 0.35 | 733 | 0.24 | 95 |
|   | 0.3 | 0.02 | 725 | 0.29 | 98 |
|   |   | 0.03 | 742 | 0.25 | 98 |
|   |   | 0.3 | 740 | 0.21 | 97 |
|   |   | 0.35 | 736 | 0.18 | 95 |
|   | 0.1 | 0.02 | 715 | 0.37 | 98 |
|   |   | 0.03 | 733 | 0.36 | 98 |
|   |   | 0.3 | 731 | 0.32 | 97 |
|   |   | 0.35 | 725 | 0.3 | 95 |
| 0.9 | 0.6 | 0.02 | 710 | 0.45 | 98 |
|   |   | 0.03 | 730 | 0.39 | 97 |
|   |   | 0.3 | 730 | 0.36 | 97 |
|   |   | 0.35 | 726 | 0.35 | 95 |
|   | 0.5 | 0.02 | 713 | 0.36 | 98 |
|   |   | 0.03 | 739 | 0.34 | 98 |
|   |   | 0.3 | 737 | 0.31 | 97 |
|   |   | 0.35 | 733 | 0.28 | 95 |
|   | 0.3 | 0.02 | 724 | 0.35 | 98 |
|   |   | 0.03 | 741 | 0.33 | 98 |
|   |   | 0.3 | 739 | 0.3 | 97 |
|   |   | 0.35 | 734 | 0.26 | 95 |
|   | 0.1 | 0.02 | 713 | 0.42 | 98 |
|   |   | 0.03 | 730 | 0.39 | 98 |
|   |   | 0.3 | 726 | 0.35 | 97 |
|   |   | 0.35 | 720 | 0.32 | 95 |

Further, a discharge voltage when $W_{poly}/W_{cat}$ is 0.3% under the conditions that the thickness of the catalyst layer 102 of the anode catalyst layer is 3 μm, and the thickness of the cathode catalyst layer is 10 μm or more, an average discharge rate of fluoride ion when operating a cell for 500 hours, and a voltage ratio when changing the fuel utilization factor are shown.

TABLE 6

Cathode catalyst layer thickness

| Pt volume density in anode catalyst layer g/cm³ | Pt volume density in cathode catalyst layer g/cm³ | Weight ratio of catalyst (Pt catalyst + carbon) and electrolyte resin in anode catalyst layer % | Thickness of anode catalyst layer μm | Thickness of cathode catalyst layer μm | Discharge voltage mV | Fluoride ion discharge rate μg/day/cm² | Discharge voltage ratio Uf |
|---|---|---|---|---|---|---|---|
| 3 | 0.3 | 0.3 | 3 | 5 | 710 | 0.31 | 98 |
|   |   |   |   | 7 | 713 | 0.23 | 98 |
|   |   |   |   | 10 | 733 | 0.19 | 98 |
|   |   |   |   | 15 | 736 | 0.18 | 98 |
|   |   |   |   | 20 | 738 | 0.18 | 97 |

In the anode 109, there is the tendency that the discharge amount of fluoride ion is small as the conductive carbon fine particles are small, and one not containing the conductive carbon fine particles was most excellent in characteristics.

On the other hand, in the cathode 110, fluoride ion showed the minimum value in the catalyst layer 102 containing a certain amount of conductive carbon fine particles.

In general, in the case of having Pt fine particles on conductive carbon fine particles carried, according to the ratio of carrying the particle diameter of Pt fine particles varies, so specific surface area of the catalyst varies, and therefore a quantitative comparison was difficult. However, from the present investigation result, the same result was obtained even though Pt fine particles having the same particle diameter were mixed with the conductive carbon fine particles, and from this fact, it could be confirmed that the ratio of carbon and Pt gives influence to the characteristics.

In the case where the mixing ratio is high, it is considered that electrical contact among Pt particles decreases, and as a result, an effective catalyst area decreased. On the other hand, in the case where the mixing ratio is low, it is considered that because the catalyst layer 102 which is a reaction field was not appropriately formed, an effective reaction area decreased, and as a result, the characteristics deteriorated.

From Table 5 and Table 6, when Pt volume density in the anode 109 is 1 g/cm$^3$ or more, Pt volume density in the cathode 110 is 0.1 to 0.5 g/cm$^3$, and in addition, ($W_{poly}/W_{cat}$) is from 0.03 to 0.3%, and further, when in Table 6, the thickness of the cathode catalyst layer is from 1 to 5 μm, and the thickness of anode catalyst layer is 10 μm or more, the discharge voltage is 730 mV or more, the fluoride ion discharge rate is 0.3 μg/day/cm$^2$, and the discharge voltage ratio when changing the fuel utilization factor is all 95% or higher. Thus, it was revealed to show excellent efficiency and durability.

Example 3

In Table 7, regarding the electrode catalyst of the catalyst layer 102 of the cathode 110, Pt particles and conductive carbon fine particles were not mixed, and the electrode catalyst in which Pt particles are carried on the conductive carbon fine particles was used.

It is considered that by having Pt particles carried on the conductive carbon fine particles, Pt particles are further finely divided, and activity of the catalyst improves.

TABLE 7

Pt carrying C

| Pt volume density in anode catalyst layer g/cm$^3$ | Pt volume density in cathode catalyst layer g/cm$^3$ | Weight ratio of catalyst (Pt catalyst + carbon) and electrolyte resin in anode catalyst layer % | Thickness of anode catalyst layer μm | Alloy fine particle diameter nm | Discharge voltage mV | Fluoride ion discharge rate μg/day/cm$^2$ | Discharge voltage ratio Uf |
|---|---|---|---|---|---|---|---|
| 2 | 0.4 | 0.15 | 0.5 | 6 nm | 730 | 0.37 | 97 |
| | | | | 10 nm | 725 | 0.41 | 97 |
| | | | | 15 nm | 722 | 0.45 | 95 |
| | | | 1 | 6 nm | 745 | 0.12 | 98 |
| | | | | 10 nm | 742 | 0.17 | 97 |
| | | | | 15 nm | 735 | 0.19 | 96 |
| | | | 5 | 6 nm | 748 | 0.11 | 97 |
| | | | | 10 nm | 744 | 0.15 | 95 |
| | | | | 15 nm | 740 | 0.18 | 94 |
| | | | 7 | 6 nm | 748 | 0.11 | 94 |
| | | | | 10 nm | 745 | 0.15 | 91 |
| | | | | 15 nm | 742 | 0.19 | 89 |

From the test result, improvement in the discharge voltage and slight decrease in fluoride ion elution rate were shown as compared with the case where the catalyst is only mixed without carrying the Pt particles. This cause is considered due to decrease in reaction overvoltage by improvement of catalyst activity and decrease in hydrogen peroxide formation amount.

Example 4

In Table 8, the case of using a catalyst using Pt/Ru alloy particles, not a catalyst using Pt particles, as the electrode catalyst of the catalyst layer 102 of the anode 109, was investigated. The result is shown below.

TABLE 8

Anode Pt/Ru alloy

| Pt volume density in anode catalyst layer g/cm$^3$ | Pt volume density in cathode catalyst layer g/cm$^3$ | Weight ratio of catalyst (Pt catalyst + carbon) and electrolyte resin in anode catalyst layer % | Thickness of anode catalyst layer μm | Alloy fine particle diameter nm | Discharge voltage mV | Fluoride ion discharge rate μg/day/cm$^2$ | Discharge voltage ratio Uf |
|---|---|---|---|---|---|---|---|
| 2 | 0.1 | 0.15 | 0.5 | 6 nm | 715 | 0.33 | 97 |
| | | | | 10 nm | 712 | 0.38 | 96 |
| | | | | 15 nm | 710 | 0.39 | 95 |
| | | | 1 | 6 nm | 739 | 0.16 | 98 |
| | | | | 10 nm | 733 | 0.19 | 97 |
| | | | | 15 nm | 726 | 0.23 | 96 |
| | | | 5 | 6 nm | 742 | 0.15 | 97 |
| | | | | 10 nm | 738 | 0.18 | 95 |
| | | | | 15 nm | 735 | 0.22 | 93 |

TABLE 8-continued

Anode Pt/Ru alloy

| Pt volume density in anode catalyst layer g/cm³ | Pt volume density in cathode catalyst layer g/cm³ | Weight ratio of catalyst (Pt catalyst + carbon) and electrolyte resin in anode catalyst layer % | Thickness of anode catalyst layer μm | Alloy fine particle diameter nm | Discharge voltage mV | Fluoride ion discharge rate μg/day/cm² | Discharge voltage ratio Uf |
|---|---|---|---|---|---|---|---|
| | | | 7 | 6 nm | 743 | 0.14 | 93 |
| | | | | 10 nm | 741 | 0.2 | 90 |
| | | | | 15 nm | 737 | 0.25 | 87 |

Even in the case of Pt/Ru alloy particles, the discharge voltage slightly decreased with the total Pt amount decreasing, but influence was not almost observed with respect to durability or utilization factor dependency.

In the Examples, explanation was given with respect to fine particles of Pt and Pt/Ru alloy, but the effect of the present invention develops by the electrode catalyst in the anode catalyst layer, and the weight ratio of the conductive carbon fine particles and the electrolyte resin. Therefore, even in Pt alloy catalyst comprising an alloy of Pt and other metal other than Ru, the same effect can be obtained. Further, even using two kinds of electrode catalyst obtained by mixing Pt catalyst and Pt alloy catalyst, the same effect can be obtained.

INDUSTRIAL APPLICABILITY

The polymer electrolyte fuel cell of the present invention suppresses deterioration of a polyelectrolyte due to hydrogen peroxide or radicals, formed in an electrode, and it is expected that it can establish a high durability of a fuel cell using a solid polymer electrolyte, particularly a fixed cogeneration system, electric automobiles and the like.

The invention claimed is:

1. A solid polymer electrolyte fuel cell comprising:
a membrane electrode assembly having an anode having a catalyst layer, a cathode having a catalyst layer, arranged facing the anode, and a polyelectrolyte membrane arranged between the anode and the cathode, and
a pair of separator plates that are arranged facing each other so as to sandwich the membrane electrode assembly, and having an anode side gas channel for supplying a fuel gas to the anode, and a cathode side gas channel for supplying an oxidant gas to the cathode, formed thereon,
wherein the catalyst layer of the anode contains at least one electrode catalyst selected from the group consisting of Pt particles and Pt alloy particles, having a particle diameter of from 6 to 10 nm,
the catalyst layer of the cathode contains an electrode catalyst consisting of Pt particles,
the catalyst layer of the anode has a thickness of from 1 to 5 μm,
Pt volume density in the catalyst layer of the anode is from 1 to 5 g/cm³,
the catalyst layer of the cathode has a thickness of 10 μm or more,
Pt volume density in the catalyst layer of the cathode is from 0.1 to 0.5 g/cm³,
a mixing ratio of conductive carbon particles in the catalyst layer of the anode to the at least one electrode catalyst selected from the group consisting of Pt particles and Pt alloy particles is from 0 to 5%, and
a mixing ratio of conductive carbon particles in the catalyst layer of the cathode to the electrode catalyst consisting of Pt particles is from 30 to 60%.

2. The solid polymer electrolyte fuel cell according to claim 1, wherein the catalyst layer of the anode further contains a polyelectrolyte.

3. The solid polymer electrolyte fuel cell according to claim 2, wherein the ratio of the content of the polyelectrolyte in the catalyst layer to the electrode catalyst is from 0.03 to 0.3% by weight.

4. The solid polymer electrolyte fuel cell according to claim 2, wherein the catalyst layer of the anode further contains the conductive carbon particles.

5. The solid polymer electrolyte fuel cell according to claim 4, wherein the ratio of the content of the polyelectrolyte in the catalyst layer to the sum of the electrode catalyst and the conductive carbon particles is from 0.03 to 0.3% by weight.

6. The solid polymer electrolyte fuel cell according to claim 4, wherein the ratio of the content of the polyelectrolyte in the catalyst layer to the conductive carbon particles is not more than 5% by weight.

7. The solid polymer electrolyte fuel cell according to claim 1, wherein the catalyst layer of the anode further contains a polyelectrolyte only.

8. The solid polymer electrolyte fuel cell according to claim 7, wherein the ratio of the content of the polyelectrolyte in the catalyst layer to the electrode catalyst is from 0.03 to 0.3% by weight.

9. The solid polymer electrolyte fuel cell according to claim 2, wherein the electrode catalyst in the catalyst layer of the cathode is carried on the conductive carbon particles.

10. The solid polymer electrolyte fuel cell according to claim 2, wherein the electrode catalyst in the catalyst layer of the anode contains only Pt alloy particles.

* * * * *